US008826321B2

(12) United States Patent  (10) Patent No.: US 8,826,321 B2
Cronin  (45) Date of Patent: Sep. 2, 2014

(54) OBTAINING USER REACTIONS TO VIDEO

(71) Applicant: Microsoft Corporation, Redmond, WA (US)

(72) Inventor: Dennis G. Cronin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 14/073,712

(22) Filed: Nov. 6, 2013

(65) Prior Publication Data

US 2014/0068651 A1  Mar. 6, 2014

Related U.S. Application Data

(63) Continuation of application No. 11/962,468, filed on Dec. 21, 2007, now Pat. No. 8,621,502.

(51) Int. Cl.
*H04N 7/173* (2011.01)

(52) U.S. Cl.
USPC ........ 725/24; 725/9; 725/10; 725/11; 725/12; 725/13; 725/14; 725/15; 725/16; 725/32; 725/33; 725/34; 725/35; 725/36; 725/46

(58) Field of Classification Search
CPC .................................................. H04N 21/4756
USPC ................. 725/9–16, 24, 32–36, 46
See application file for complete search history.

(56) References Cited

U.S. PATENT DOCUMENTS

| | | | |
|---|---|---|---|
| 6,349,410 B1 | 2/2002 | Lortz | |
| 6,519,771 B1 | 2/2003 | Zenith | |
| 6,762,773 B2 | 7/2004 | Kolde | |
| 6,871,323 B2 | 3/2005 | Wagner | |
| 7,111,320 B1 | 9/2006 | Novak | |
| 8,621,502 B2 | 12/2013 | Cronin | |
| 2002/0144273 A1 | 10/2002 | Reto | |
| 2004/0034873 A1 | 2/2004 | Zenoni | |
| 2004/0059625 A1 | 3/2004 | Schrader | |
| 2004/0098754 A1 | 5/2004 | Vella et al. | |
| 2004/0231003 A1 | 11/2004 | Cooper et al. | |
| 2005/0015803 A1 | 1/2005 | Macrae | |
| 2005/0028208 A1 | 2/2005 | Ellis | |
| 2005/0262542 A1 | 11/2005 | DeWeese | |
| 2006/0095401 A1 | 5/2006 | Krikorian et al. | |
| 2006/0164324 A1 | 7/2006 | Polivy | |
| 2007/0106557 A1 | 5/2007 | Varghese | |
| 2008/0244655 A1 | 10/2008 | Mattila et al. | |
| 2009/0089832 A1 | 4/2009 | Kendall | |
| 2009/0165030 A1 | 6/2009 | Cronin | |
| 2009/0178081 A1 | 7/2009 | Goldenberg | |

OTHER PUBLICATIONS

"Final Office Action", U.S. Appl. No. 11/962,468, (Feb. 28, 2013), 20 pages.

(Continued)

*Primary Examiner* — Nicholas Corbo

(74) *Attorney, Agent, or Firm* — Micah Goldsmith; Glen Johnson; Micky Minhas

(57) ABSTRACT

A user interaction request is received during playback of video content. The user interaction request can be received independent of any indication from the video content that user interaction is possible. In response to receiving the interaction request, one or more menus are displayed allowing the user to select one or more reaction options and to select whether the selected one or more reaction options are to be communicated to another user or to a content provider.

20 Claims, 10 Drawing Sheets

(56) References Cited

OTHER PUBLICATIONS

"Final Office Action", U.S. Appl. No. 11/962,468, (Dec. 7, 2010), 18 pages.
"Non-Final Office Action", U.S. Appl. No. 11/962,468, (Apr. 22, 2013), 18 pages.
"Non-Final Office Action", U.S. Appl. No. 11/962,468, (Aug. 19, 2010), 17 pages.
"Non-Final Office Action", U.S. Appl. No. 11/962,468, (Aug. 28, 2012), 19 pages.
"Notice of Allowance", U.S. Appl. No. 11/962,468, (Aug. 23, 2013), 9 pages.
Andrea, et al., "Living@room: a Support for Direct Sociability through Interactive TV", Retrieved from: <http://soc.kuleuven.be/com/mediac/socialitv/Living@room°/020-%20a%20Support%-20for%20Direct%20Sociability%20through%20Interactive%20TV.pdf> on Oct. 26, 2007, (2006), 2 pages.
Chellomedia, "RTL to Pilot Chellomedia's Red Button Application on 'My First Home' TV Show", *Chellomedia Interactive Services*, (Jun. 25, 2007), 2 pages.
Lekakos, Georgios et al., "Information Systems in the Living Room: A Case Study of Personalized Interactive TV Design", Retrieved from: <http://www.spinellis.gr/pubs/conf/2001-ECIS-iTV/html/itv.htm> on Oct. 29, 2007, Proceedings of the 9th European Conference on Information Systems, (Jun. 2001), 14 pages.

OBTAINING USER REACTIONS TO VIDEO

RELATED APPLICATION

This application is a continuation of, and claims priority to U.S. patent application Ser. No. 11/962,468, filed on Dec. 21, 2007, the disclosure of which is incorporated by reference herein.

BACKGROUND

Television programs are viewed by users throughout the world. Typically, television programs are transmitted or distributed to users' televisions where they are watched by the users, or sometimes stored on a recording medium and watched at a later time. This typical scenario for watching programs, however, can be problematic because it is very limiting for users. Programs are transmitted to and displayed on users' televisions with very little, if any, user reaction to the program being forwarded to others. The user simply selects a television program and watches the program.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a user interaction request is received during playback of video content. In response to receiving the user interaction request, an interaction menu is displayed that includes both an interact with friend option and an interact with content provider option. A user selection of one of the interact with friend option and the interact with content provider option is received. If user selection of the interact with friend option is received, then one or more menus including reaction options and recipient options are displayed. However, if user selection of the interact with content provider option is received, then one or more menus including reaction options is displayed.

In accordance with one or more aspects, at a first device an alert is received that another user of a second device has sent a video content message to a user of the first device. A request to view video content corresponding to the video content message is received from the user, and in response to the request the video content is played. A reaction option associated with the video content is received from the user, and this reaction option is sent to the second device.

In accordance with one or more aspects, a user interaction request is received during playback of video content. The user interaction request is received independent of any indication from the video content that user interaction is possible. In response to receiving the interaction request, one or more menus are displayed allowing the user to select one or more reaction options and to select whether the selected one or more reaction options are to be communicated to a second user or to a content provider. The selected one or more reaction options are sent to the selected one of the second user or the content provider.

BRIEF DESCRIPTION OF THE DRAWINGS

The same numbers are used throughout the drawings to reference like features.

DETAILED DESCRIPTION

Obtaining user reactions to video is discussed herein. While watching video content on a device, the user is able to input a user interaction request. On-screen menus are then displayed to the user, allowing the user to provide reactions regarding the content to other users of other devices and/or the content provider. This interaction can occur at any point(s) during the video playback that the user desires. The video content creator does not need to specifically enable the ability to provide feedback or to interact with the content. The system provides default appropriate interactions at any point in the video content. However this does not preclude the video content creator from optionally defining specific unique context-sensitive interaction options for certain portions (or all) of the content. The user is also able to receive additional video content from other users. When received, the user can pause playback of the video content he or she is currently watching, watch the additional video content he or she has received, and provide a reaction to the user that sent the additional video content.

Figure 1:
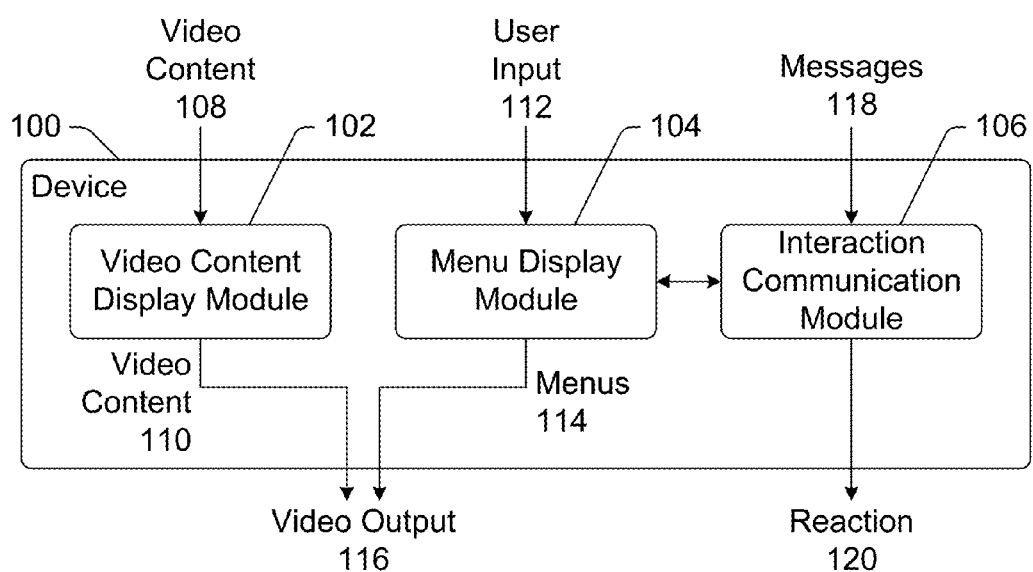
FIG. 1 illustrates an example device implementing the obtaining user reactions to video in accordance with one or more embodiments.

FIG. 1 illustrates an example device 100 implementing the obtaining user reactions to video in accordance with one or more embodiments. Device 100 can be any of a variety of devices that output video for display. For example, device 100 can be a computer, such as a desktop computer, a mobile station, an entertainment appliance, a set-top box communicatively coupled to a display device, a video playback device (e.g., digital video recorder (DVR), digital versatile disk (DVD) player, etc.), a television, a wireless phone, a game console, an automotive PC, and so forth. Thus, device 100 can range from full resource devices with substantial memory and processor resources (e.g., personal computers, game consoles, etc.) to a low-resource device with limited memory and/or processing resources (e.g., traditional set-top boxes, hand-held game consoles, DVD players, etc.).

Device 100 includes a video content display module 102, a menu display module 104, and an interaction communication module 106. Video content display module 102 receives video content 108 and outputs video content 110. Video content display module 102 converts video content 108 into a format that can be displayed by a display device, and outputs the converted video content as video content 110. Video content display module 102 can also receive input from a user (e.g., via a remote control device) or other component or module of device 100 to control the output of video content 110, such as to pause playback of the content, select particular video content for playback, fast forward or rewind through the video content, and so forth. Other types of content, such as audio content, corresponding to video content 108 are also oftentimes received and played back with the display of video content 110.

Video content 108 can be any of a variety of different types of content, such as television shows, movies, advertisements (ads) or commercials, and so forth. Video content 108 can be received from any of a variety of different sources. These sources can be local sources, such as a hard disk or a DVD that is inserted into, coupled to, or included as part of device 100. These sources can also be remote sources, such as one or more remote servers or other devices making content 108 available to device 100. Remote sources can make content 108 available over any of a variety of networks, such as one or more of the Internet, a wide area network (WAN), a local area network (LAN), a wireless network, a telephone network, an intranet, and so forth.

Menu display module 104 receives user input 112. User input 112 can be a user interaction request, a selection of a menu option, and so forth. User input 112 is typically input via one or more buttons on a remote control device corresponding to device 100. Alternatively, user input 112 can be input in different manners, such as via one or more buttons of device 100, as audible inputs, and so forth.

Menu display module 104 generates one or more menus 114 allowing the user to interact with video content 108. This interaction can include, for example, selecting when to send a reaction regarding content 108, selecting what reaction to send, selecting the recipient of the reaction, and so forth. This interaction and the various menus are discussed in more detail below.

In one or more embodiments, menus 114 are independent of video content 108. This independence refers to generating menus 114 at any time during playback of the video content in response to user input 112—menus 114 are not restricted to being generated at any particular time during playback of the video content and are not based on the video content itself. The provider or author of content 108 need not enable specific portions of the video content for interaction, and need not specify any particular information to be displayed in menus 114.

In alternate embodiments, menus 114 can be based at least in part on video content 108. In such alternate embodiments, metadata can be included in video content 108 that can be used in the generation of menus 114. This metadata can be included in any of a variety of manners, such as in a vertical blanking interval (VBI), as closed captioning data, as a separate data stream, and so forth. Menu display module 104 can still generate menus 114 at any time in response to user input 112, but at least some of the options or information in those menus 114 is obtained from this meta data. Additionally, the metadata can specify when particular information is to be included in menus 114.

For example, assume that video content 108 is a sitcom. Metadata associated with video content 108 can indicate that a "corny" reaction is to be displayed in a menu 114 at times corresponding to corny jokes in the sitcom. By way of another example, assume that video content 108 is a television show with four contestants. Metadata associated with video content 108 could specify that, during particular times of the television show, a menu 114 should include reaction options allowing one of the four contestants to be selected by the user.

One or both of video content 110 and menus 114 are output by device 100 as video output 116. In one or more embodiments, device 100 displays video output 116. In other embodiments device 100 generates a video signal based on video content 110 and/or menus 114 that is output to one or more other devices which in turn display video output 116. Device 100 also typically plays back other content associated with video content 110, such as audio content, or generates a signal based on this other content that is output to one or more other devices to play back or otherwise present the content.

Interaction communication module 106 receives messages 118. Messages 118 are typically received from other users of other devices 100. Interaction communication module 106 can optionally filter messages 118, alerting the user of device 100 to only specific messages and dropping or otherwise ignoring other messages. For example, the user of device 100 can configure a list of users (e.g., friends, buddies, etc.) accessible to communication module 106, the list of users being those users that he or she desires to receive messages from. Interaction communication module 106 thus alerts the user of device 100 to any messages from users on the list, and drops or otherwise ignores messages from any user not on the list.

Messages 118 can include any of a variety of information. For example, messages 118 can include a video clip for the user of device 100 to watch, a reaction regarding video content from another user, and so forth. These messages and the information they include are discussed in more detail below.

Interaction communication module 106 also communicates reaction information 120 to one or more recipients. These recipients can be, for example, users of other devices, content providers, and so forth. Reaction(s) 120 correspond to video content 108. The particular reaction to be communicated, as well as the recipient of the reaction, is determined by menu display module 104 from user input 112. Menu display module 104 communicates the reaction and intended recipient to interaction communication module 106, which in turn communicates the reaction to the intended recipient.

In the discussions herein, multiple references are made to displaying multiple selection options (e.g., in a menu or other listing) to the user. The user is able to select a particular one of the options displayed. It is to be appreciated that this selection can be performed in any of a variety of different manners. In one or more embodiments, the user is able to identify a particular one of multiple options that are displayed. Different techniques can be used to identify a particular option, such as displaying a selection icon adjacent to a particular option, highlighting a particular option, changing font and/or color of a particular option, changing the size of a particular option, changing the animation of a particular options, scrolling through options so only one option is displayed at a time, and so forth. The user can control which particular option is identified in any of a variety of different manners, such as by user pressing or otherwise activating a button(s) or other input mechanism on a remote control device (e.g., up and down arrow buttons, scroll wheel, etc.), pressing or otherwise activating a button(s) or other input mechanism on a device displaying the options, inputting verbal or other audible commands, and so forth.

Once a particular option is identified, the user can select that particular option using any of a variety of different techniques. Such a selection can be made, for example, by pressing or otherwise activating a button or other input mechanism on a remote control device (e.g., an "enter" button, pressing a scroll wheel, etc.), pressing or otherwise activating a button(s) or other input mechanism on a device displaying the options, inputting verbal or other audible commands, and so forth.

Additionally, in the discussions herein multiple references are made to a user being able to exit out of a menu. The user can exit out of a menu in any of a variety of different manners, such as by selecting an exit or cancel option displayed in the menu, by pressing an exit or cancel button on a remote control corresponding to the device displaying the menu, by allowing the menu to be displayed for a threshold amount of time without a selection of any displayed option being made, and so forth.

Figure 2:
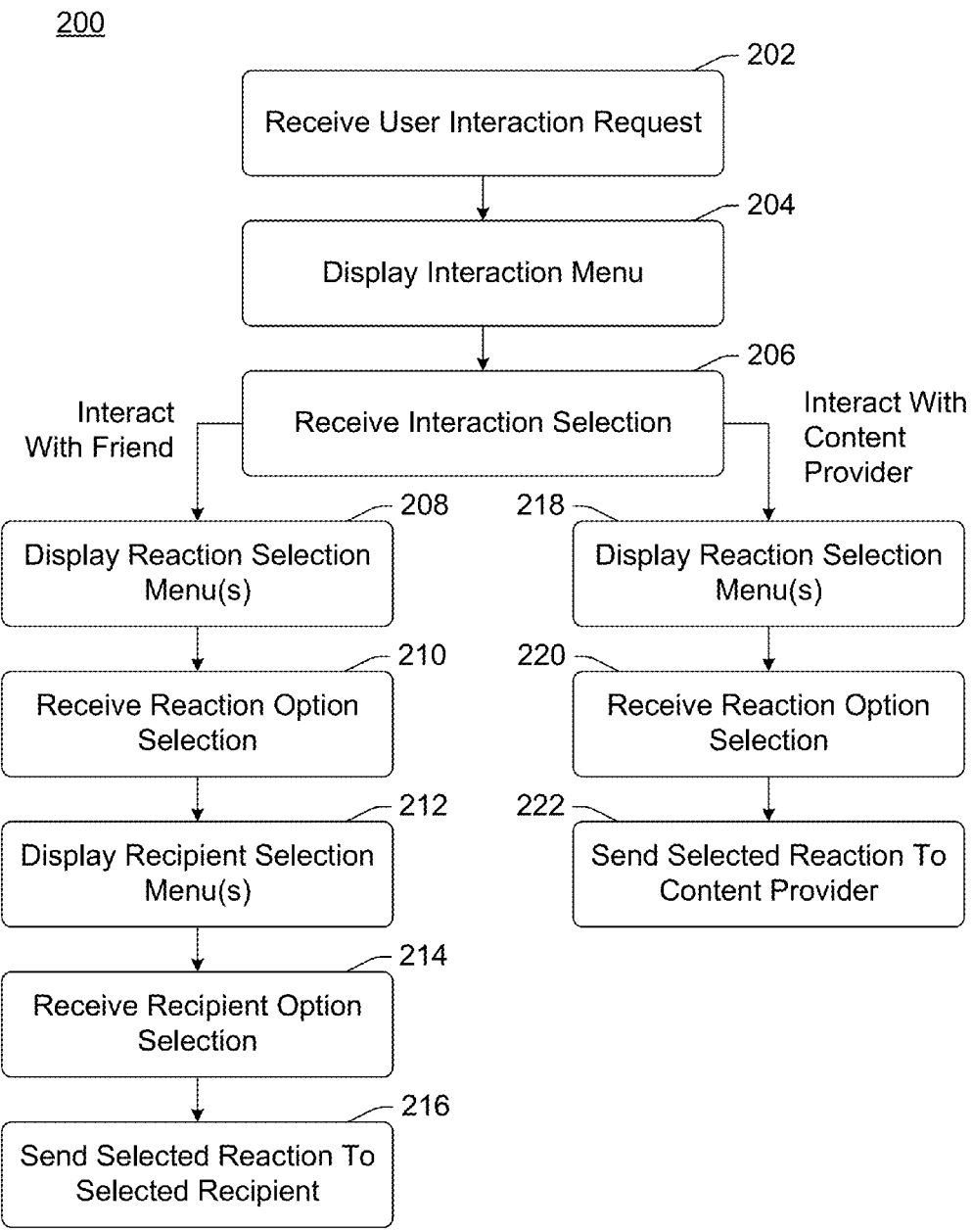
FIG. 2 is a flowchart illustrating an example process for obtaining user reactions to video in accordance with one or more embodiments.

FIG. 2 is a flowchart illustrating an example process 200 for obtaining user reactions to video in accordance with one or more embodiments. Process 200 is carried out by a device, such as device 100 of FIG. 1, and can be implemented in software, firmware, hardware, or combinations thereof.

Initially, a user interaction request is received (act 202). The user interaction request is typically received during playback of video content, such as playback of a television program or movie. The user interaction request received in act 202 is independent of the video content being played back. The user interaction request being independent of the video content being played back refers to allowing the user to input a user interaction request whenever he or she desires at any time during playback of the video content. The user is not restricted to inputting a user interaction request only when the video content displays an icon (or button, or other indication) or otherwise indicates that user interaction is possible.

The interaction request received in act 202 can be input by the user in any of a variety of manners. In one or more embodiments, the interaction request is input by a user pressing or otherwise activating an "interact" button on a remote control device corresponding to the device implementing process 200. Alternatively, the interaction request can be input in other manners, such as by the user pressing or otherwise activating a button on the device implementing process 200, by the user inputting a verbal or other audible command, by the user selecting an on-screen button by navigating a cursor over the on-screen button and pressing a button on a cursor control device, and so forth.

In one or more embodiments, playback of the video content being played back when the user interaction request is received in act 202 is paused. Alternatively, playback of the video content may continue while the menu(s), discussed in more detail below, are displayed in process 200.

In response to receiving the user interaction request, an interaction menu is displayed (act 204). The interaction menu allows the user to select a type of recipient for the user's reaction regarding the video content being played back. In one or more embodiments, the interaction menu allows the user to select between interacting with a friend and interacting with the content provider. The content provider could be, for example, a show provider (e.g., a television program provider, a movie provider, a live broadcast provider, and so forth) or alternatively an advertisement provider. Accordingly, in one or more embodiments the interaction menu allows the user to select among interacting with a friend, interacting with a program provider, and interacting with an advertisement provider.

Figure 3:
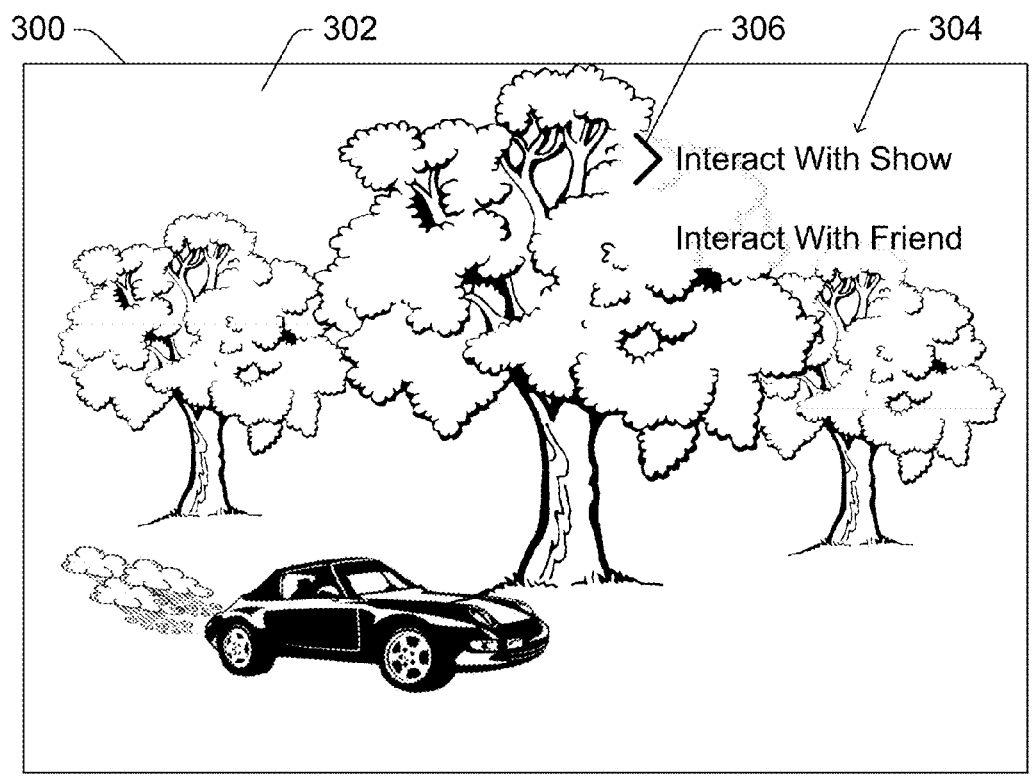
FIG. 3 illustrates an example display of an interaction menu in accordance with one or more embodiments.

FIG. 3 illustrates an example display of an interaction menu in accordance with one or more embodiments. A display 300 includes a full-screen or full-window portion 302 in which video content is displayed. This video content is, for example, video content 110 of FIG. 1 as output by device 100. Display 300 also includes an interaction menu 304.

Interaction menu 304 includes two options from which the user can select: an interact with show option and an interact with friend option. A selection icon 306 is illustrated in FIG. 3 to allow the user to identify and select a particular one of the options displayed in interaction menu 304. Alternatively, other techniques can be used to allow the user to identify and select a particular one of the options displayed in interaction menu 304 as discussed above.

The interact with show option allows the user to interact with a content provider, allowing the user to provide a reaction to the content provider. The interact with friend option allows the user to interact with one or more other users. The user can select either of these options, or alternatively exit out of interaction menu 304.

In the example of FIG. 3, only two options are displayed. Alternatively, other options can be displayed, such as an interact with ad option. These other options can be displayed in addition to, or alternatively in place of, one or more of the options illustrated in FIG. 3. Additionally, in the example of FIG. 3, interaction menu 304 includes a single page or display in which all the options are displayed. Alternatively, the options can be distributed across multiple pages, and a "next" option or particular page number identifier option can be displayed that allows the user to view the other page(s).

Returning to FIG. 2, an interaction selection is received (act 206). This interaction selection is a user selection of one of the options displayed in the interaction menu in act 204. Alternatively, if the user were to exit out of the interaction menu, then display of the interaction menu ceases and process 200 ends.

Process 200 then proceeds based on the particular option that is selected in act 206. If the user selects the interact with friend option, then a reaction selection menu displaying one or more reaction options is displayed to the user (act 208). The interaction menu that was displayed in act 204 is replaced by the reaction selection menu displayed in act 208.

A variety of different reaction options are made available to the user, and the user is able to select one of these reaction options. The reaction options can include any of a variety of different reactions that a user may have to particular video content. For example, the reaction options can include options representing emotional reactions that the user may have, such as a thumbs up or thumbs down reaction to express approval or disapproval of the video content, a smile or happy reaction to express happiness with the video content, a sad or frown reaction to express unhappiness with the video content, a gross or disgusting reaction to express that the user found the video content gross, a laugh reaction to express that the user found the video content humorous, and so forth. Other reaction options such as a request for the user to be called on the phone, emailed, instant messaged, and so forth can also be included in the reaction selection menu. It is to be appreciated that these reactions are only examples, and that any of a wide variety of different reactions that a user could have to video content can be included as a reaction option in the reaction selection menu displayed in act 208.

Figure 4:
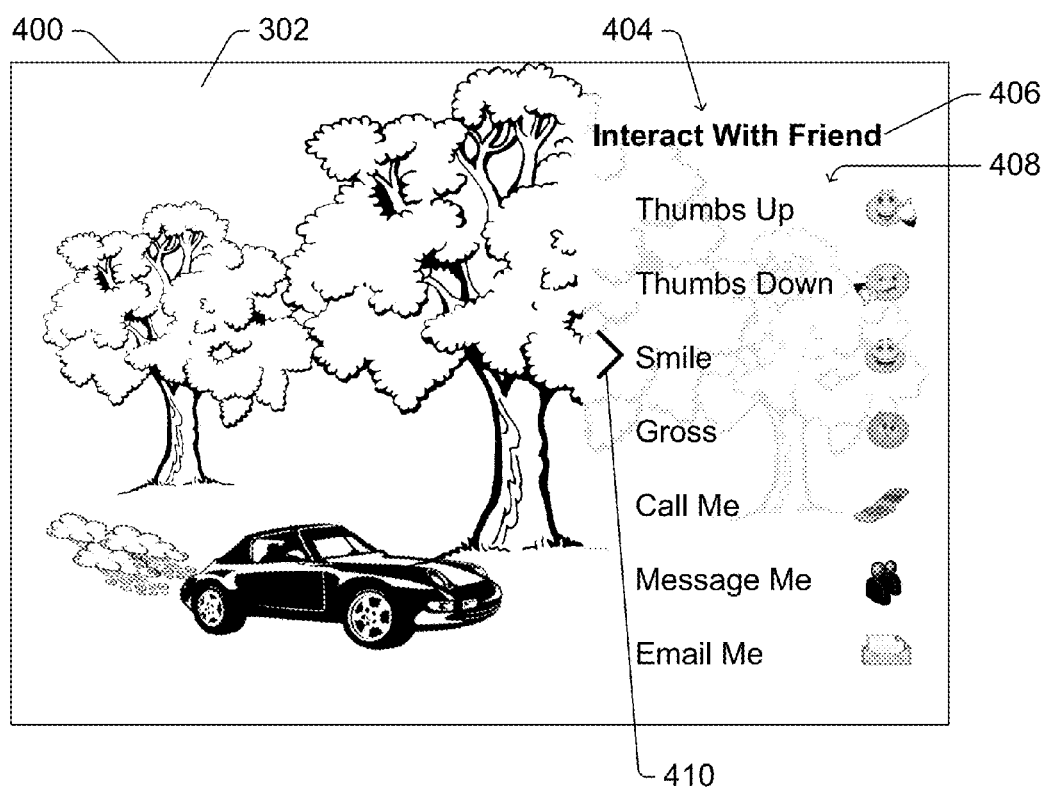
FIG. 4 illustrates an example display of a reaction selection menu in accordance with one or more embodiments.

FIG. 4 illustrates an example display of a reaction selection menu in accordance with one or more embodiments. A display 400 includes a full-screen or full-window portion 302 in which video content is displayed. This video content is, for example, video output 110 of FIG. 1 as output by device 100. In the example of FIG. 4 it is assumed that playback of the video content was paused when the user interaction request was received (in act 202 of FIG. 2), so the video content displayed in portion 302 is the same as illustrated in FIG. 3. Display 400 also includes a reaction selection menu 404.

Reaction selection menu 404 includes a title 406 indicating that the interact with friend option was selected from the interaction menu displayed in act 204 of FIG. 2. Reaction selection menu 404 allows the user to select a particular reaction option for the video content being played back. Reaction selection menu 404 includes multiple reaction options 408, and the user is able to identify and select a particular one of the reaction options 408 by moving a selection icon 410. Alternatively, other identification and selection techniques can be used as discussed above.

In the example of FIG. 4, the reaction options are thumbs up, thumbs down, smile, gross, call me, message me, and email me. It is to be appreciated that these are only example reaction options. Alternatively, one or more of the reaction options illustrated in FIG. 4 may not be included in menu 404 and/or additional reaction options may be included in menu 404. The user can select any one or more of the reaction options displayed in reaction selection menu 404. Alternatively, the user can exit out of reaction selection menu 404.

Additionally, in the example of FIG. 4 the reaction options are listed with a text description and a graphical representation (also referred to as an emoticon). It is to be appreciated that the reaction options can alternatively be presented in a variety of other manners. For example, only a text description may be displayed, only an emoticon may be displayed, a video sequence or animation may be displayed, an audible description may be played back, and so forth. Additionally, in the example of FIG. 4, reaction selection menu 404 includes a single page or display in which all the reaction options are displayed. Alternatively, the reaction options can be distributed across multiple pages, and a "next" option or particular page number identifier option can be displayed that allows the user to view the other page(s).

In one or more embodiments, when reaction selection menu 404 is displayed, selection icon 410 initially identifies one of the reaction options included in menu 404. This initially identified reaction option can be determined in any of a variety of manners, such as being the first reaction option displayed in the menu, the reaction option most recently selected by the user, a randomly selected reaction option, and so forth.

Returning to FIG. 2, a reaction option selection is received (act 210). This reaction option selection is a user selection of one of the reaction options displayed in the reaction selection menu in act 208. Alternatively, if the user were to exit out of the reaction selection menu, then display of the reaction selection menu ceases and process 200 ends.

A recipient selection menu is then displayed (act 212). The reaction option selection menu that was displayed in act 208 is replaced by the recipient selection menu in act 212. One or more possible recipients for the selected reaction option are displayed to the user. This display of possible recipients is also referred to as a display of recipient options. The particular recipients that are to be displayed in the recipient selection menu can be determined in any of a variety of different manners. In one or more embodiments, the recipients are obtained from a "friends" or "buddies" list that is created by the user for another application (such as instant messaging, video gaming, and so forth), from a "friends" or "buddies" list that is created by the user specifically for use with the obtaining user reactions to video discussed herein, from an email address book maintained by the user, and so forth.

Figure 5:
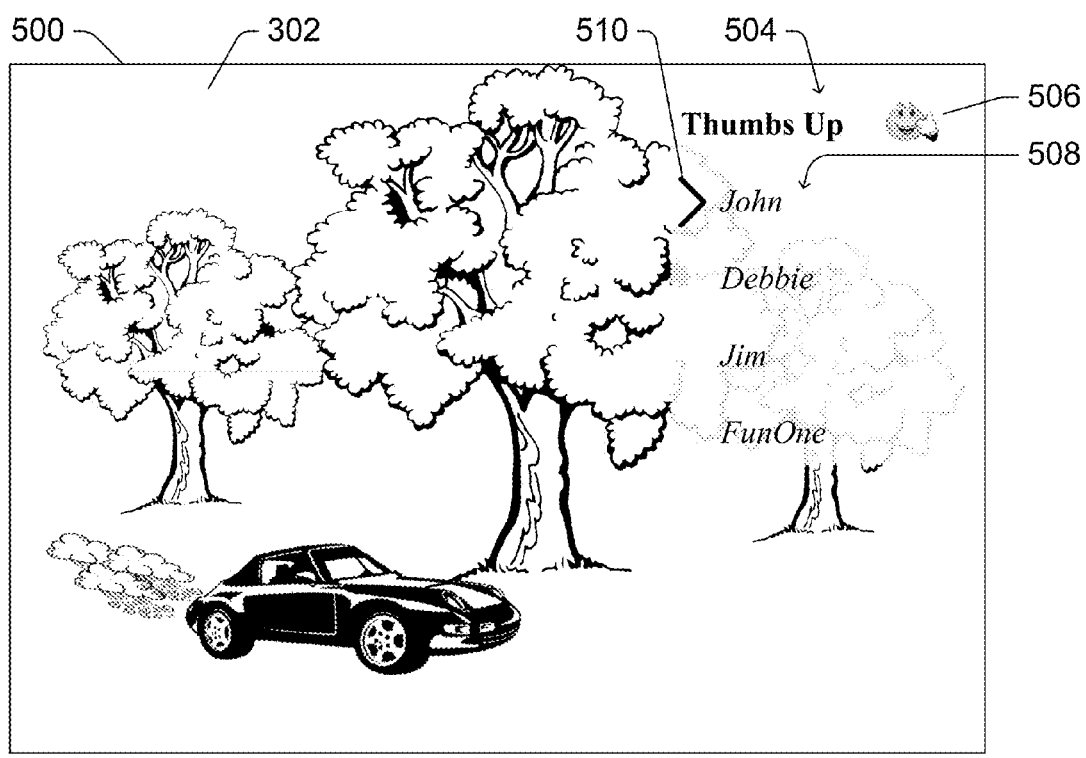
FIG. 5 illustrates an example display of a recipient selection menu in accordance with one or more embodiments.

FIG. 5 illustrates an example display of a recipient selection menu in accordance with one or more embodiments. A display 500 includes a full-screen or full-window portion 302 in which video content is displayed. This video content is, for example, video output 110 of FIG. 1 as output by device 100.

In the example of FIG. 5 it is assumed that playback of the video content was paused when the user interaction request was received (in act 202 of FIG. 2), so the video content displayed in portion 302 is the same as illustrated in FIGS. 3 and 4. Display 500 also includes a recipient selection menu 504.

Recipient selection menu 504 includes a title 506 indicating that the thumbs up reaction option was selected from the reaction selection menu displayed in act 208 of FIG. 2. Recipient selection menu 504 allows the user to select a particular recipient for the selected reaction option (the thumbs up reaction in this example). Recipient selection menu 504 includes multiple recipient options 508, and the user is able to identify and select a particular one of the recipient options 508 by moving a selection icon 510. Alternatively, other identification and selection techniques can be used as discussed above.

In the example of FIG. 5, the recipient options are identified as John, Debbie, Jim, and FunOne. It is to be appreciated that these are only example recipient options—the specific recipient options will vary by user. The user can select any one or more of the recipient options displayed in recipient selection menu 504. Alternatively, the user can exit out of recipient selection menu 504.

Each of the recipient options identified in menu 504 has associated contact information. This contact information can be any of a variety of different types of information, such as an email address, a network (e.g., Internet Protocol (IP)) address of a device being used by the recipient, a gamer tag or other identifier for online gaming, and so forth. This contact information can be used to send the selected reaction to the selected recipient, as discussed in more detail below.

In the example of FIG. 5, the recipient options are listed with a text description. It is to be appreciated that the recipient options can alternatively be presented in a variety of other manners. For example, a graphical representation of the user (also referred to as an avatar) may be displayed, a video sequence or animation may be displayed, an audible description may be played back, and so forth. Additionally, one or more of these may be displayed concurrently (e.g., a text description and a graphical representation).

Furthermore, in the example of FIG. 5, recipient selection menu 504 includes a single page or display in which all the recipient options are displayed. Alternatively, the recipient options can be distributed across multiple pages, and a "next" option or particular page number identifier option can be displayed that allows the user to view the other page(s).

In one or more embodiments, when recipient selection menu 504 is displayed, selection icon 510 initially identifies one of the recipient options included in menu 504. This initially identified recipient option can be determined in any of a variety of manners, such as being the first recipient option displayed in the menu, the recipient option most recently selected by the user, a randomly selected recipient option, and so forth.

Returning to FIG. 2, a recipient option selection is received (act 214). This recipient option selection is a user selection of one of the recipient options displayed in the recipient selection menu in act 212. Alternatively, if the user were to exit out of the recipient selection menu, then display of the recipient selection menu ceases and process 200 ends.

The selected reaction, which is the reaction option received in act 210, is then sent to the selected recipient, which is the recipient option received in act 214 (act 216). Additionally, display of the recipient option selection menu ceases after the recipient option selection is received. A summary of the selected reaction and the selected recipient can optionally be displayed to the user prior to sending in act 216, allowing the user to confirm the selected reaction and recipient prior to sending. Furthermore, if playback of the video content was paused when the user interaction request was received in act 202, then playback of the video content resumes.

Additional information can also optionally be sent to the selected recipient in act 216. In one or more embodiments an identification of the user sending the reaction option and information identifying the video content as well as the location in the video clip that the reaction option corresponds to is sent to the selected recipient. The reaction option corresponds to the video content that was being played back when the user interaction request was received in act 202. The location of the video content that the reaction option corresponds to is the location of the video content that was being played back when the user interaction request was received in act 202.

Additionally, in one or more embodiments one of the reaction options is an option to send a video clip to the selected recipient. This video clip could optionally be included with one or more of the other reaction options discussed above. The video clip is a portion of the video content being displayed, or alternatively is all of the video content. In embodiments where the video clip is less than all of the video content, the portion of the video content to be included as the video clip can be identified in any of a variety of different manners. For example, a pre-defined portion of the video content can be included as the video clip, such as the portion of the video content spanning from a threshold amount of time (e.g., 30 seconds) before the user interaction request was received during playback of the video content to another threshold amount of time (e.g., 30 seconds) after the user interaction request was received. By way of another example, the current scene of the video content being displayed when the user interaction was received can be included as the video clip, with conventional scene detection techniques being used to identify the beginning and ending of the scene in the video content being displayed when the user interaction request was received. By way of yet another example, a user interface can be presented to the user to allow the user to identify the portion to be included as the video clip, such as by selecting particular locations along a displayed timeline corresponding to the video content.

The manner in which the reaction option sent to the selected recipient is managed at the device being used by the selected recipient can vary. In one or more embodiments, the reaction option is displayed to the selected recipient by the selected recipient's device, optionally along with an indication of the video content corresponding to the reaction option, and optionally with an indication of a location of the video content corresponding to the reaction option. The reaction option can be automatically displayed to the selected recipient, or alternatively the selected recipient can be alerted to the presence of a message including the reaction option and the selected recipient can determine whether to have the reaction option displayed.

Returning to act 206, if the user selects the interact with content provider option, then a reaction selection menu displaying one or more reaction options is displayed to the user (act 218). The reaction options displayed in act 218 can be any of the reaction options discussed above with respect to act 208. Any of a variety of different reaction options can be displayed in the reaction selection menu in act 218, and these can be the same reaction options, or alternatively different reaction options, than are displayed in the reaction selection menu in act 208.

Figure 6:
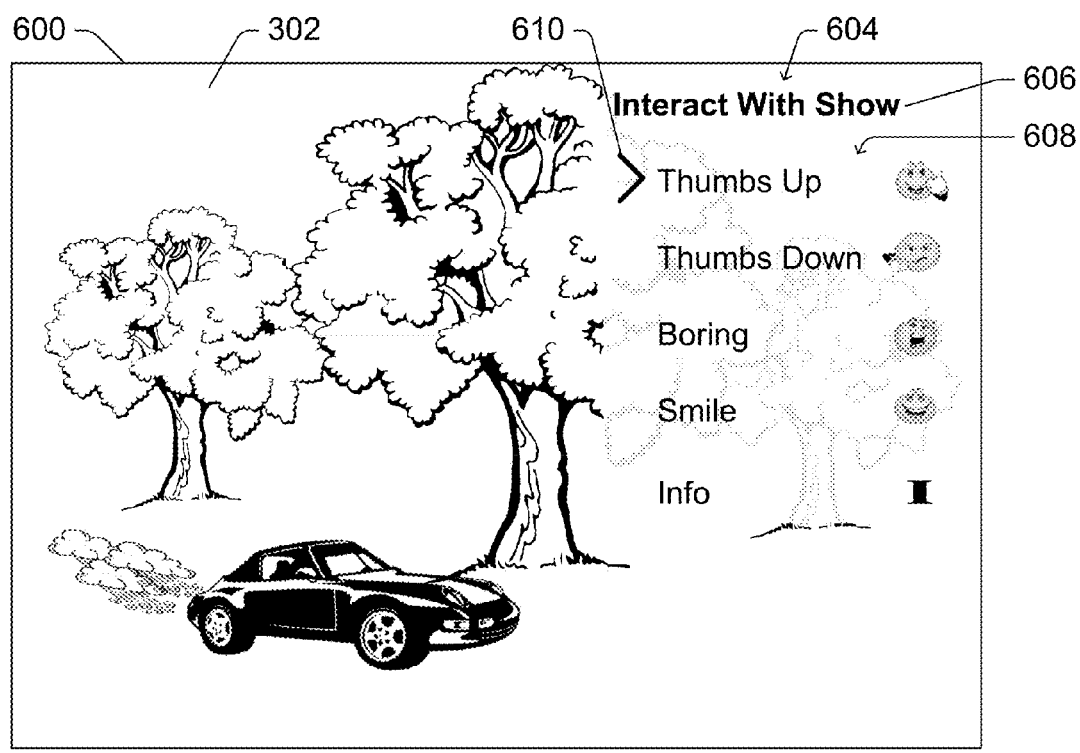
FIG. 6 illustrates another example display of a reaction selection menu in accordance with one or more embodiments.

FIG. 6 illustrates another example display of a reaction selection menu in accordance with one or more embodiments. A display 600 includes a full-screen or full-window portion 302 in which video content is displayed. This video content is, for example, video output 110 of FIG. 1 as output by device 100. In the example of FIG. 6 it is assumed that playback of the video content was paused when the user interaction request was received (in act 202 of FIG. 2), so the video content displayed in portion 302 is the same as illustrated in FIG. 3. Display 600 also includes a reaction selection menu 604.

Reaction selection menu 604 is similar to reaction selection menu 404 of FIG. 4, however menu 604 corresponds to an interact with show option rather than an interact with friend option. Reaction selection menu 604 includes a title 606 indicating that the interact with content provider option was selected from the interaction menu displayed in act 204 of FIG. 2. In the example of FIG. 6, the content provider is a show or program (rather than an advertisement), so title 606 indicates that the reaction options are for interaction with the show provider (e.g., rather than with an advertisement provider). Alternatively, title 606 could indicate "content provider" rather than "show".

Reaction selection menu 604 allows the user to select a particular reaction option for the video content being played back. Reaction selection menu 604 includes multiple reaction options 608, and the user is able to identify and select a particular one of the reaction options 608 by moving a selection icon 610. Alternatively, other identification and selection techniques can be used as discussed above.

In the example of FIG. 6, the reaction options are thumbs up, thumbs down, boring, smile, and info (to request additional info describing the show). It is to be appreciated that these are only example reaction options. Alternatively, one or more of the reaction options illustrated in FIG. 6 may not be included in menu 604 and/or additional reaction options may be included in menu 604. The user can select any one or more of the reaction options displayed in reaction selection menu 604. Alternatively, the user can exit out of reaction selection menu 604.

Additionally, in the example of FIG. 6 the reaction options are listed with a text description and an emoticon. Analogous to the discussion above regarding menu 404 of FIG. 4, the reaction options can alternatively be presented in a variety of other manners.

In one or more embodiments, when reaction selection menu 604 is displayed, selection icon 610 initially identifies one of the reaction options included in menu 604. This initially identified reaction option can be determined in any of a variety of manners, such as being the first reaction option displayed in the menu, the reaction option most recently selected by the user, a randomly selected reaction option, and so forth.

Figure 7:
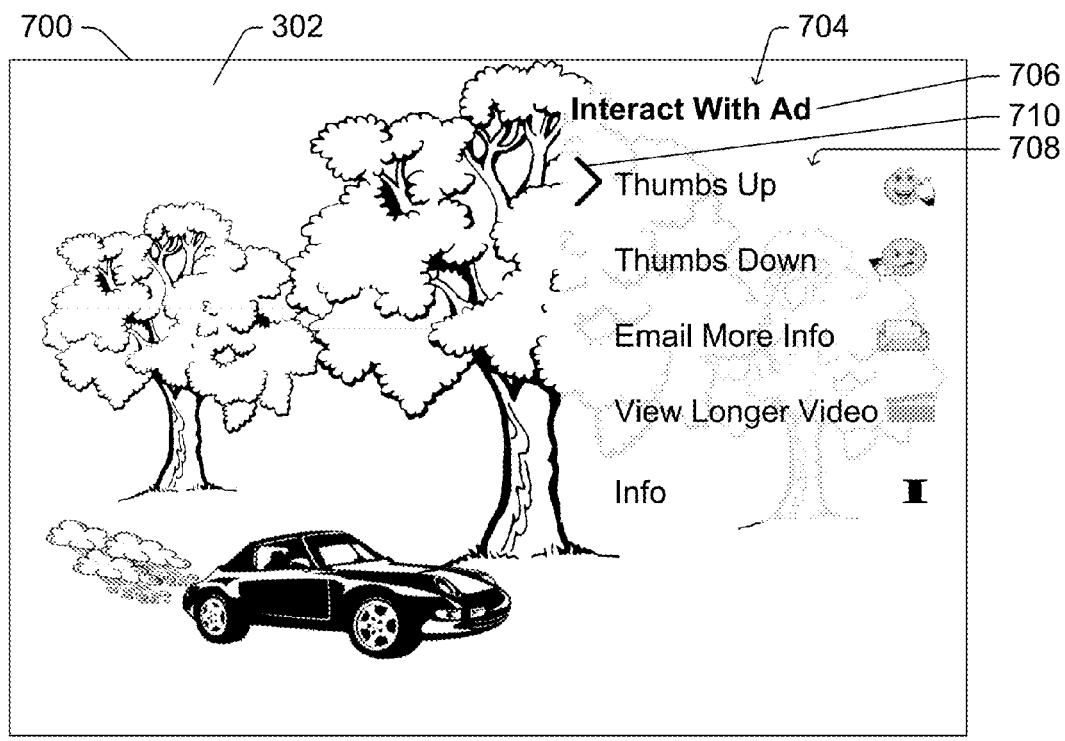
FIG. 7 illustrates another example display of a reaction selection menu in accordance with one or more embodiments.

FIG. 7 illustrates another example display of a reaction selection menu in accordance with one or more embodiments. FIG. 7 includes a display 700 analogous to display 600 of FIG. 6, except that reaction selection menu 704 corresponds to an interact with ad (advertisement) option rather than an interact with show option. Reaction selection menu 704 includes a title 706 indicating that the interact with content provider option was selected from the interaction menu displayed in act 204 of FIG. 2, and in the example of FIG. 7 the content provider is an advertisement provider. Alternatively, title 706 could indicate "content provider" rather than "ad".

In one or more embodiments, whether the interact with show (of FIG. 6) or the interact with ad (of FIG. 7) reaction selection menu is displayed is automatically determined. This automatic determination can be made in different manners, such as based on the particular video content being displayed at the time when the user interaction request is received in act 202. If an advertisement is being displayed when the user interaction request is received in act 202, then an interact with ad reaction selection menu is displayed. However, if other non-advertising program content is being displayed when the user interaction request is received in act 202, then an interact with show reaction selection menu is displayed.

Alternatively, whether the interact with show (of FIG. 6) or the interact with ad (of FIG. 7) reaction selection menu is displayed can be determined by the user. For example, both an interact with show option and an interact with ad option can be displayed in the interaction menu displayed in act 204. If the user selects the interact with show option, then an interact with show reaction selection menu is displayed. However, if the user selects the interact with ad option, then an interact with ad reaction selection menu is displayed.

Reaction selection menu 704 allows the user to select a particular reaction option for the video content being played back. Reaction selection menu 704 includes multiple reaction options 708, and the user is able to identify and select a particular one of the reaction options 708 by moving a selection icon 710. Alternatively, other identification and selection techniques can be used as discussed above.

In the example of FIG. 7, the reaction options are thumbs up, thumbs down, email more info, view longer video, and info. It is to be appreciated that these are only example reaction options. Alternatively, one or more of the reaction options illustrated in FIG. 7 may not be included in menu 704 and/or additional reaction options may be included in menu 704. The user can select any one or more of the reaction options displayed in reaction selection menu 704. Alternatively, the user can exit out of reaction selection menu 704.

In the example of FIG. 7, the reaction options are listed with a text description and an emoticon. Analogous to the discussion above regarding menu 404 of FIG. 4, the reaction options can alternatively be presented in a variety of other manners.

Returning to FIG. 2, a reaction option selection is received (act 220). This reaction option selection is a user selection of one of the reaction options displayed in the reaction selection menu in act 218. Alternatively, if the user were to exit out of the reaction selection menu, then display of the reaction selection menu ceases and process 200 ends.

The selected reaction, which is the reaction option received in act 220, is then sent to the content provider (act 222). The content provider refers to one or more parties or groups that are associated with the video content and that have some responsibility related to creation of, distribution of, and/or monitoring of feedback for the video content. The content provider can be, for example, an author of the video content, a distributor of the video content, a third party operating as an agent (e.g., for an author, distributor, or other party), another party collecting feedback for presentation to the author or distributor, and so forth.

The content provider that is to be the recipient of the reaction option is automatically identified and thus need not be identified by the user. The content provider can be automatically identified in different manners. For example, the device implementing process 200 may be configured with a default recipient, the video content may include an identifier of the recipient, and so forth. Additionally, display of the reaction option selection menu ceases. Furthermore, if playback of the video content was paused when the user interaction request was received in act 202, then playback of the video content resumes.

Additional information can also optionally be sent to the content provider in act 222. In one or more embodiments an identification of the user sending the reaction option and information identifying the video content as well as the location in the video content that the reaction option corresponds to is sent to the selected recipient. Additionally, a particular identifier of a portion of the video content can be sent, such as an identifier of a particular advertisement or commercial, an identifier of a particular scene of a show, and so forth.

The reaction option sent to the content provider in act 222 can be used by the content provider in any of a variety of different manners. For example, if the video content is a live performance, the reaction options received from multiple users can be displayed to the individual(s) giving the performance during the performance. This allows the individual(s) giving the performance to receive feedback from users watching the performance on their television as the performance is occurring. By way of another example, the reaction options can be recorded and analyzed by the content provider (or by a service run by a distributor of the video content) to determine what portions users liked, disliked, thought were funny, thought were disgusting, what reactions were selected by users when different actors and/or actresses were on-screen, and so forth. By way of yet another example, the reaction options can be made available to other users (e.g., via a web site), allowing others to view users' reactions to particular video content.

Additionally, in one or more embodiments the reaction option sent to the content provider can include a request for further information. For example, an info reaction option is included as one of the reaction options 608 in FIG. 6. In response to receiving the info reaction option, the content provider can return additional information about the content to the user. This additional information could be biographical information about individuals appearing in the video content, historical information about the video content, information regarding how to purchase a DVD of the content, information regarding a product advertised in the content, and so forth. The additional information can be communicated to the user in any of a variety of manners, such as a video clip to be played back by the user while playback of the video content is paused, information to be emailed to the user (e.g., to an email address sent along with the reaction option in act 222 of FIG. 2), a phone call from a service or product representative (e.g., to a phone number sent along with the reaction option in act 222 of FIG. 2), and so forth.

In the example of FIG. 2, an interaction menu is displayed in response to receiving the user interaction request. Alternatively, in response to receiving the user interaction request, the reaction selection menu is displayed. After a reaction option selection is received, a recipient selection menu is displayed analogous to act 212 discussed above, except that the recipient selection menu would include one or more of friends, the show provider, and the ad provider. Thus, in this alternate embodiment the user is able to select a reaction option and then select the recipient of the reaction option, which could be the show provider or ad provider if desired.

In another alternate embodiment, an option to interact with friend option may not be made available to the user. In this alternate embodiment, the interact with content provider would be the only option, so an interaction menu need not be displayed in act 204. Rather, process 200 can proceed from act 202 directly to act 218.

In the examples of FIGS. 3, 4, 5, 6, and 7 the menus are displayed as being transparent—the underlying video content in portion 302 can be partially seen through each of the menus. This transparency can be achieved in any of a variety of conventional manners, such as by combining, for each pixel or display location in a menu, the pixel or display location values of the underlying video content and the corresponding pixel or display location values of the menu. For example, the pixel or display location values could be weighted (e.g., 15% of the underlying video content's value, and 85% of the menu's value) and added together to generate a pixel or display location value for each pixel or display location in the menu. Alternatively, one or more of the menus can be opaque, preventing the underlying video content in portion 302 from being seen through the menu(s).

Additionally, in the examples of FIGS. 3, 4, 5, 6, and 7 the menus are displayed as vertical lists overlaying the right-hand portion of the video content being displayed in portion 302. It is to be appreciated that the menus can be displayed in any part of portion 302, such as on the left-hand side, at the top, at the bottom, in the middle, and so forth. It is further to be appreciated that the menus can be other than vertical lists, such as horizontal lists, diagonal lists, and so forth. It is also to be appreciated that the menus can take forms other than lists, so long as the information in the menus is communicated to the user. In addition, one or more of the menus could be displayed elsewhere other than overlaying portion 302, such as adjacent to portion 302.

Furthermore, it is to be appreciated that the size of the menus illustrated in FIGS. 3, 4, 5, 6, and 7 are only examples, and that menus of different sizes can alternatively be used. The menus, including the options displayed therein, can be larger or smaller than is shown in FIGS. 3, 4, 5, 6, and 7.

In addition, the menus illustrated in FIGS. 3, 4, 5, 6, and 7 are illustrated as replacing one another after a selection is made. For example, when a selection is made from interaction menu 304 of FIG. 3, interaction menu 304 is replaced with reaction option selection menu 404 of FIG. 4. Alternatively, rather than replacing a previously displayed menu, one or more of the previously displayed menus can continue to be displayed. The multiple menus can be displayed in different areas overlaying and/or adjacent to portion 302 displaying the video content.

Additionally, it should be noted that although multiple different menus are discussed with reference to FIG. 2 and are displayed in FIGS. 3, 4, 5, 6, and 7 one or more of these menus can be combined or separated into additional menus. For example, two menus could be combined, displaying the reaction option(s) and recipient option(s) in the same menu. By way of another example, a menu can be separated into multiple menus, such as multiple different menus including different types of reaction options (e.g., one menu with positive reaction options, one menu with negative reaction options, one menu with various options for how the user desires to be contacted (e.g., email, phone, instant messaging, etc.), and so forth).

Furthermore, in the various discussions of menus with reference to FIGS. 2, 3, 4, 5, 6, and 7, the menus display various default interactions from which the user can select. As discussed above, however, in one or more embodiments some or all of the information displayed in a particular menu can be obtained from metadata associated with the video content. In such embodiments, when a menu is to be displayed during playback of the video content the metadata associated with the video content is checked for information to include in a menu. If such information is available from the metadata, then that information is displayed in the menu in addition to, or alternatively in place of, the information that would otherwise have been displayed in the menu.

The metadata associated with the video content can specify various parameters regarding when and/or how particular information is to be displayed in a menu(s). The metadata can specify particular portions of the video content during which particular information is to be displayed in a menu if the menu is displayed. Additionally, the metadata can specify which particular menu(s) the information is to be displayed in. For example, the metadata can specify that the information is to be displayed in the reaction selection menu(s) displayed in act 208 of FIG. 2. Furthermore, the metadata can specify whether the information is to replace, or be in addition to, the information that would otherwise be displayed in the menu.

Thus, individual video content creators or providers are able to easily specify particular information for display in the menus by simply adding that information to metadata associated with the video content. However, no such information need be included. If no such metadata is associated with the video content, then various default menus with various default information is displayed to the user as discussed above with reference to FIGS. 2, 3, 4, 5, 6, and 7.

Figure 8:
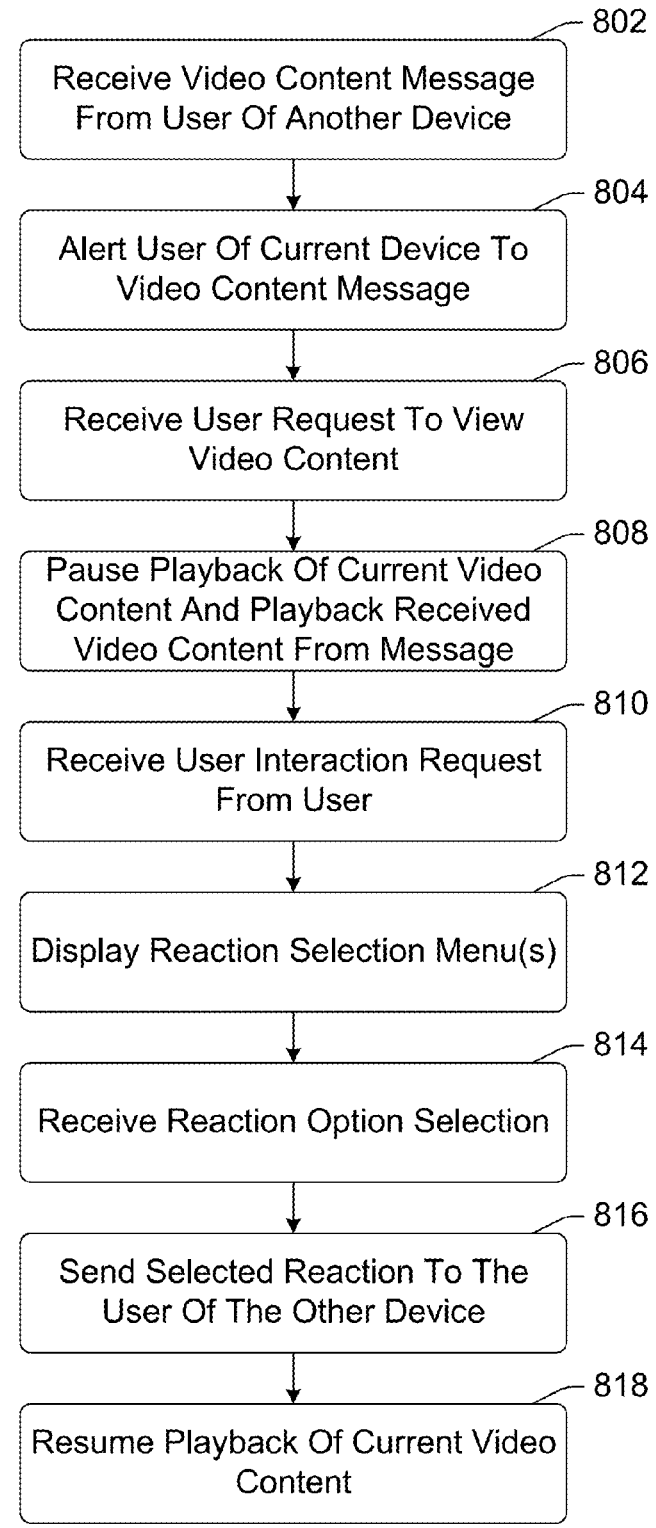
FIG. 8 is a flowchart illustrating another example process for obtaining user reactions to video in accordance with one or more embodiments.

Additionally, in one or more embodiments a user can receive a message or other notice from another user regarding a video clip. The video clip can be the entirety of video content being played back by the other user, or alternatively only a portion of the video clip. FIG. 8 is a flowchart illustrating another example process 800 for obtaining user reactions to video in accordance with one or more embodiments. Process 800 is carried out by a device, such as device 100 of FIG. 1, and can be implemented in software, firmware, hardware, or combinations thereof.

Initially, a video content message is received from a user of another device (act 802). This video content message has corresponding video content, which can be video content included in the message, or an identifier of where particular video content can be obtained (e.g., a uniform resource locator (URL) or other identifier). This video content message can be a message sent as part of act 216 of FIG. 2, or alternatively can be sent separately. For example, any video content obtained in any manner can be sent as part of a video content message in act 802.

The user of the current device is alerted to the video content message (act 804). This alert can take any of a variety of different forms, such as a message displayed to the user on the device on which the user is playing back different video content, an audible message, an indication on a remote control device, and so forth.

A user request to view the video content from the video content message is then received (act 806). The user request can be received in any of a variety of different manners, such as selection of an "interact" button on a remote control device, selection of an "ok" or "watch" option displayed in a menu, selection of an "ok" or "watch" option that is part of the alert displayed in act 804, and so forth.

Playback of the current video content being played back by the viewer is then paused and the received video content is played back (act 808). The user can watch the entirety of the received video content, or alternatively can terminate playback of the received video content and resume playback of the current video content that was being played back when the request was made in act 806. Alternatively, if no video content is being played back when the request was made in act 806, then no such video content need be paused in act 808.

A user interaction request is then received from the user (act 810). A reaction selection menu is displayed (act 812), and a reaction option selection is received (act 814). Acts 810, 812, and 814 are analogous to acts 202, 208, and 210, respectively, of FIG. 2 discussed above, except that the video content being referred to is the video content from the message received in act 802.

The selected reaction is then sent to the user of the other device (act 816), which is the user of the device from which the message was received in act 802. Accordingly, the selected reaction is returned to the user from which the video content message was received in act 802. The sending of the selected reaction is analogous to the sending in act 216 of FIG. 2 discussed above, except that the recipient is automatically selected in act 816. That is, rather than having the user select the recipient of the selected reaction in process 800, the recipient is the user (and that user's device) from which the message was received in act 802. Alternatively, one or more other recipients can be selected, analogous to acts 212 and 214 of FIG. 2 discussed above. Such selected recipients can be in place of, or in addition to, the user from which the message was received in act 802.

Playback of the current video content (the video content that was being played back when the request was received in act 806) then resumes (act 818). Alternatively, if no video content was being played back when the request was received in act 806, then no such video content playback need be resumed in act 818.

In the example of process 800, it is assumed that any reaction to the video content is returned to the other user from which the video content message was received in act 802. Accordingly, a reaction selection menu is displayed in act 812 in response to the user interaction request being received from the user. In alternate embodiments, process 200 of FIG. 2 is used in place of acts 812-816. Thus, the user is able to send reactions to the user from which the video content message was received, to other users, to the content provider (e.g., show author, show distributor, advertiser, etc.) In such alternate embodiments, when the recipient selection menu is displayed, the user from which the video content message was received in act 802 can be the initially identified recipient.

Process 800 assumes that the user pauses playback of current video content in order to play back the video content from the message received in act 802. Alternatively, the user may choose to wait rather than interrupt the current video content playback. In such situations a user interface is presented to the user allowing him or her to view received messages and select those messages for playback of the video content from those messages.

Figure 9:
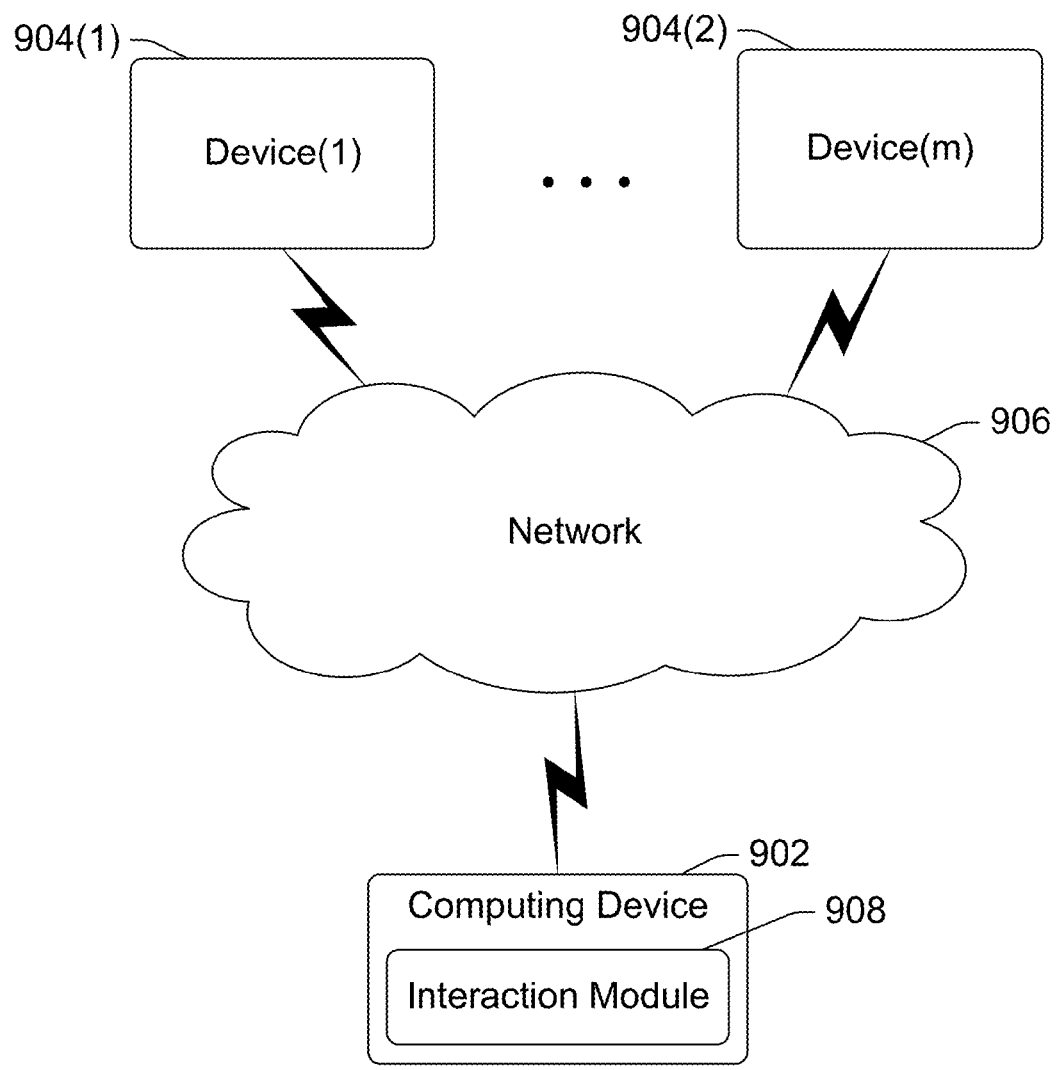
FIG. 9 illustrates an example system in which the obtaining user reactions to video can be used in accordance with one or more embodiments.

FIG. 9 illustrates an example system 900 in which the obtaining user reactions to video can be used in accordance with one or more embodiments. System 900 includes a computing device 902 that can communicate with one or more (m) other devices 904 via a network 906. Network 906 can be any of a variety of networks, including the Internet, a local area network (LAN), a wide area network (WAN), combinations thereof, and so forth.

Devices 904 can be any of a variety of different computing devices. One or more of devices 904 can be server devices from which video content can be streamed or otherwise transferred to computing device 902. One or more of devices 904 can also be other computing devices 902 from which video content messages (as discussed in act 802 of FIG. 8) can be received.

Computing device 902 can be any of a variety of different computing devices, such as computing device 100 of FIG. 1. Computing device 902 includes an interaction module 908. Interaction module 908 allows a user to provide reactions regarding video content to friends and/or the content provider as discussed herein. Interaction module 908 can be, for example, menu display module 104 and interaction communication module 106 of FIG. 1.

Figure 10:
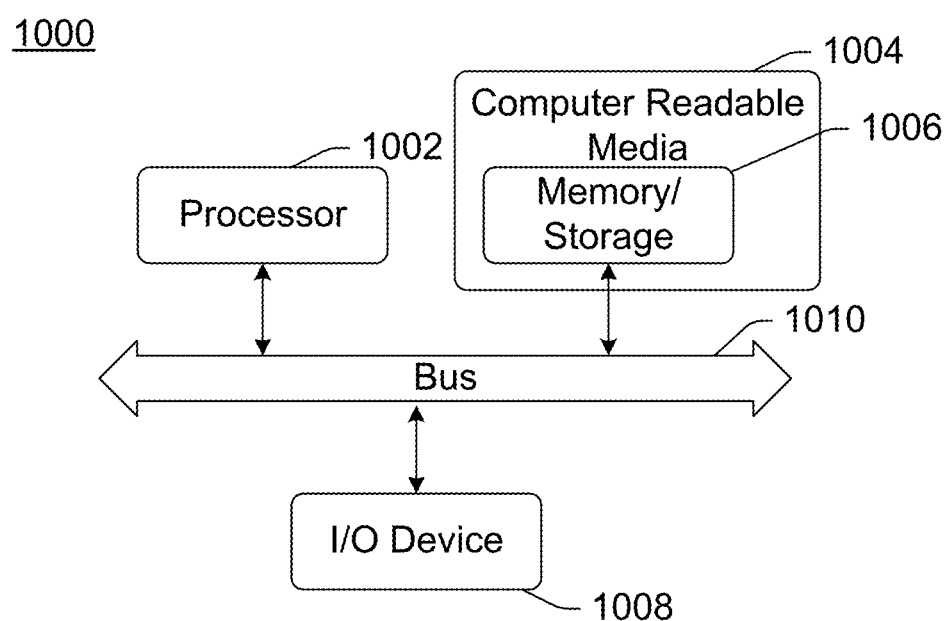
FIG. 10 illustrates an example computing device that can be configured to implement the obtaining user reactions to video in accordance with one or more embodiments.

FIG. 10 illustrates an example computing device 1000 that can be configured to implement the obtaining user reactions to video in accordance with one or more embodiments. Computing device 1000 can be, for example, computing device 100 of FIG. 1, computing device 902 of FIG. 9, or a device 904 of FIG. 9. Computing device 1000 can implement any of the techniques and processes discussed herein.

Computing device 1000 includes one or more processors or processing units 1002, one or more computer readable media 1004 which can include one or more memory and/or storage components 1006, one or more input/output (I/O) devices 1008, and a bus 1010 that allows the various components and devices to communicate with one another. Computer readable media 1004 and/or I/O device(s) 1008 can be included as part of, or alternatively may be coupled to, computing device 1000. Bus 1010 represents one or more of any of several types of bus structures, including a memory bus or memory controller, a peripheral bus, an accelerated graphics port, and a processor or local bus using any of a variety of bus architectures. Bus 1010 can include wired and/or wireless buses.

Memory/storage component 1006 represents one or more computer storage media. Component 1006 can include volatile media (such as random access memory (RAM)) and/or nonvolatile media (such as read only memory (ROM), Flash memory, optical disks, magnetic disks, and so forth). Component 1006 can include fixed media (e.g., RAM, ROM, a fixed hard drive, etc.) as well as removable media (e.g., a Flash memory drive, a removable hard drive, an optical disk, and so forth).

The techniques and processes discussed herein can be implemented in software, with instructions being executed by processing unit(s) 1002. It is to be appreciated that different instructions can be stored in different components of computing device 1000, such as in a processing unit 1002, in various cache memories of a processing unit 1002, in other cache memories of device 1000 (not shown), on other computer readable media, and so forth. Additionally, it is to be appreciated that the location where instructions are stored in computing device 1000 can change over time.

One or more input/output devices 1008 allow a user to enter commands and information to computing device 1000, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques and processes may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Additionally, it should be noted that in one or more embodiments the techniques and processes discussed herein can be implemented in hardware. For example, one or more logic circuits, application-specific integrated circuits (ASICs), programmable logic devices (PLDs), and so forth can be created and/or configured to implement the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
one or more processors;
a content rendering system configured to render video content for display;
an interaction module executed by the one or more processors and configured to:
receive a user interaction request during playback of the video content;
in response to receiving the user interaction request, display an interaction menu including an interact with friend option; and
responsive to the interact with a friend option being selected, display one or more menus including multiple reaction options and recipient options, wherein at least one of the reaction options is based at least in part on metadata associated with the video content.

2. The system of claim 1, wherein the interaction menu includes an interact with content provider option.

3. The system of claim 1, wherein the interaction menu includes an interact with content provider option comprising an interact with show option.

4. The system of claim 1, wherein the interaction menu includes an interact with content provider option comprising an interact with ad option.

5. The system of claim 1, wherein the interaction menu includes an interact with content provider option, and wherein the interaction module is configured to display one or more menus including reaction options responsive to selection of the interact with content provider option.

6. The system of claim 1, wherein one of the multiple reaction options is an option to send the video clip to a selected recipient.

7. The system of claim 1, wherein at least some of the reaction options include a text description and a graphical representation.

8. The system of claim 1, wherein each reaction option includes a text description and a graphical representation.

9. The system of claim 1, wherein the metadata specifies one or more particular portions of the video content during which information is to be displayed in a menu.

10. The system of claim 1, wherein the interaction menu is configured to be displayed in a transparent manner in which video content can be seen through the interaction menu.

11. A device comprising:
one or more processors;
one or more computer readable storage memory;
computer readable instructions stored on the one or more computer readable storage memory which, when executed by the one or more processors, perform operations comprising:
displaying an alert that a second user of a second device has sent a video content message to a first user of the first device, the second user being a user who the first user has approved to receive content messages from by way of a filter;
receiving, from the first user, a request to view video content corresponding to the video content message;
pausing, in response to receiving the request, playback of second video content being played back on the first device;
playing, in response to the request, the video content;
displaying one or more menus including multiple reaction options, wherein at least one of the reaction options is based at least in part on metadata associated with the video content;
receiving, from the first user, a reaction option associated with the video content;
automatically selecting the second user as the recipient of the reaction option based on an identifier included in the video content message; and
sending the reaction option to the second user, wherein sending further comprises sending information received via a user interface from the first user selecting a location along a displayed timeline that corresponds to the video content that the reaction option corresponds to.

12. The device of claim 11, wherein the operations further comprise terminating playback of the video content and resuming playback of the second video content after receiving the reaction option.

13. The device of claim 11, wherein receiving the reaction option comprises: displaying one or more menus including multiple reaction options; and receiving a first user selection of one of the multiple reaction options.

14. The device of claim 11, wherein the operations further comprise: displaying one or more menus including multiple reaction options; receiving a user selection of one of the multiple reaction options; and sending the selected one of the multiple reaction options to a provider of the video content.

15. A device comprising:
one or more processors;
one or more computer readable storage memory;
computer readable instructions stored on the one or more computer readable storage memory which, when executed by the one or more processors, perform operations comprising:
receiving a user interaction request during playback of video content, the user interaction request being received independent of any indication from the video content that user interaction is possible;
in response to receiving the interaction request, displaying one or more menus allowing the user to select one or more reaction options and to select whether the selected one or more reaction options are to be communicated to a second user or to a content provider, wherein displaying one or more menus comprises obtaining, from metadata associated with the video content, information to be displayed in at least one of the one or more menus, and wherein one of the multiple reaction options is an option to send a video clip to the second user and at least one of the selected one or more reaction options are configured to be automatically displayed on a device associated with the second user during playback of the video clip at the second user without invocation by the second user; and sending the selected one or more reaction options to the selected one of the second user or the content provider.

16. The device of claim 15, wherein displaying one or more menus comprises displaying, in response to user selection of an interact with content provider option in an interaction menu of the one or more menus, multiple reaction options in one of the one or more menus, the operations further comprising: receiving a user selection of one of the multiple reaction options; and wherein to send the selected one or more reaction options to the selected one of the second user or the content provider is to send the selected one of the multiple reaction options to the content provider.

17. The device of claim 15, wherein displaying one or more menus comprises displaying, in response to user selection of an interact with friend option in an interaction menu of the one or more menus, multiple reaction options in a first menu and multiple recipient options in a second menu, the operations further comprising: receiving a user selection of one of the multiple reaction options from the first menu; receiving a user selection of one of the multiple recipient options from the second menu; and wherein sending the selected one or more reaction options to the selected one of the second user or the content provider comprises sending the selected one of the multiple reaction options from the first menu to the selected one of the multiple recipient options from the second menu.

18. The device of claim 15, wherein the operations further comprise: pausing, in response to receiving the interaction request, playback of the video content; and resuming, after sending the selected one or more reaction options to the selected one of the second user or the content provider, playback of the video content.

19. The device of claim 15, wherein, displaying one or more menus comprises overlaying the one or more menus on a portion of a display in which the video content is being played back.

20. The device of claim 15, wherein at least some of the reaction options include a text description and a graphical representation.

* * * * *